United States Patent [19]

Hafner et al.

[11] 4,205,595

[45] Jun. 3, 1980

[54] PISTON

[75] Inventors: Werner Hafner, Leimen; Erich Habel, Fürth, both of Fed. Rep. of Germany

[73] Assignee: Firma Carl Freudenberg, Weinheim, Fed. Rep. of Germany

[21] Appl. No.: 872,978

[22] Filed: Jan. 27, 1978

[30] Foreign Application Priority Data

Feb. 5, 1977 [DE] Fed. Rep. of Germany ... 7703341[U]

[51] Int. Cl.² ............................................. F16J 9/08
[52] U.S. Cl. ........................................ 92/243; 92/248
[58] Field of Search ................. 92/243, 251, 258, 248; 264/263

[56] References Cited

U.S. PATENT DOCUMENTS

| 1,577,732 | 3/1926 | Lamb | 92/243 X |
| 2,216,291 | 10/1940 | Caldwell | 92/258 X |
| 2,402,268 | 6/1946 | Young | 92/251 X |
| 3,136,228 | 6/1964 | Dailey | 92/243 X |
| 3,319,537 | 5/1967 | Pittman | 92/243 X |
| 3,354,794 | 11/1967 | Dailey | 92/243 |

FOREIGN PATENT DOCUMENTS 914574 7/1954 Fed. Rep. of Germany .

Primary Examiner—Irwin C. Cohen
Attorney, Agent, or Firm—Sprung, Felfe, Horn, Lynch & Kramer

[57] ABSTRACT

A piston for use in pneumatic cylinders includes a tubular support with flange-like parts, a reinforcement ring received in the support and having a groove on its outside circumference, a guide ring rigidly mounted in the groove, and angular packing washers pre-vulcanized onto the reinforcement rings on both sides of the guide ring.

5 Claims, 2 Drawing Figures

PISTON

BACKGROUND OF THE INVENTION

The present invention relates to a pistion, particularly for use in pneumatic cylinders.

An element similar to the object of the application is described in DT-PS No. 914,574. That has to do with an elastomer material gasket for reciprocating machine parts, which has a particular guide part between the two axially pulled apart gaskets, which is formed out of the elastomer material of the main body. It has been shown that particularly in the presence of great transverse forces, such an embodiment has only insufficient properities. Particularly because of the deformations of the guide parts which occur, the gaskets often close prematurely.

SUMMARY OF THE INVENTION

The innovation of the present invention lies in that a similar construction element is developed which is particularly suitable to receive transverse forces independent of the traditional sealing function, which element can be mounted like a piston directly on a piston rod.

This is achieved by providing a piston which comprises a reinforcement ring with a guide ring mounted rigidly in a groove on its outside circumference, and angular packing washers which are prevulcanized onto the reinforcement ring on both sides of this guide ring.

According to one particular embodiment, the reinforcement ring consists of two symmetrical or asymmetrical parts which are connected together axially. According to another embodiment, the guide ring consists of plastic containing fibers, preferably a fiber-reinforced polyamide and where the fibers are non-woven or woven of synthetic and/or natural fibers.

DETAILED DESCRIPTION OF THE INVENTION

Figure 1:
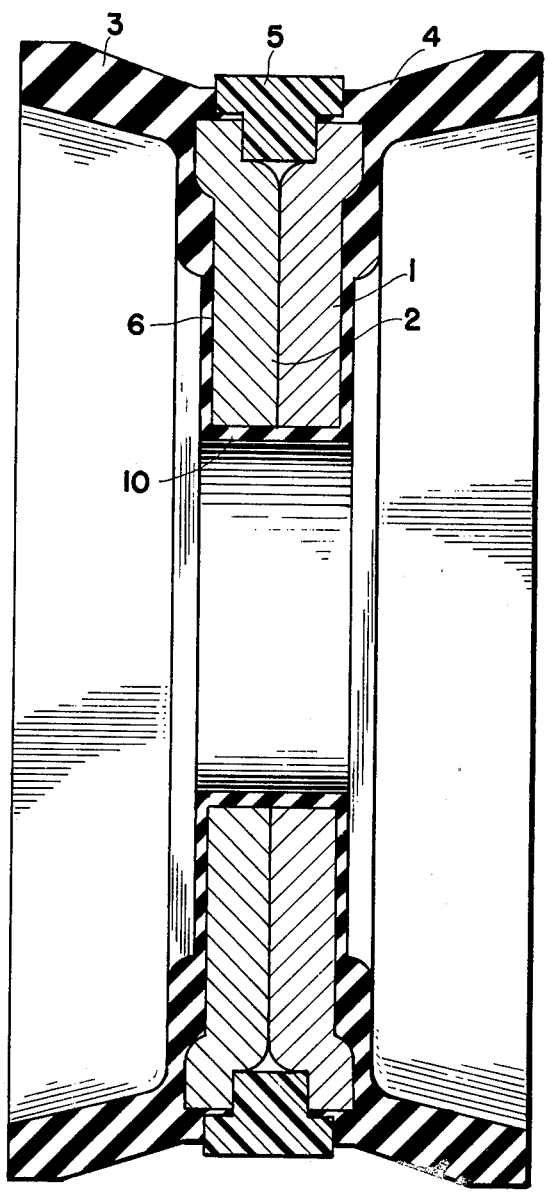
FIG. 1 shows a cross-sectional view of one embodiment as an example of the new piston.

The central construction element of the piston is a center reinforcement ring. FIG. 1 shows a two-part embodiment, consisting of homologous parts 1 and 2, which are received in a central tubular support with flange-like parts 10 and which are axially connected together by force-locking. It is particularly advantageous to use deep-drawn metal rings which are welded or glued together and fit with the insertion of the guide ring 5.

In another embodiment, a particularly dependable, mechanically rigid connection between the reinforcement ring and guide ring 5 is used wherein elastic deformations due to the stress are mostly avoided and which makes possible an exact fit in relation with the receiving cylinder. Another advantage exists here in that it is possible with this particular configuration to produce an optimum pairing of materials with regard to the friction properties between the guide ring and the cylinder wall. Particularly good properties with regard to this were obtained with guide ring 5 being of a fiber reinforced polyamide.

The new piston has angular gaskets 3, 4, prevulcanized in a known manner into the reinforcement ring on both sides of guide ring 5. The tip-stretching of both elements occurs in a coordinated work procedure with one tool, whereby it is particularly advantageous if the elastomer material surrounds the reinforcement ring on all sides. A static sealing of the piston relative to the piston rod is guaranteed, along with improvement of the corrosion resistance of the surfaces of the reinforcement ring, and a secondary packing element is not required. In certain cases, it can also be advantageous to provide additional concentric ring cutouts or beads on surface 6 of the reinforcement ring.

The advantages of this new piston are that it resists great transverse forces in continuous usage. It is very simply mounted, and optimization with respect to geometric configuration and material can be provided.

Figure 2:
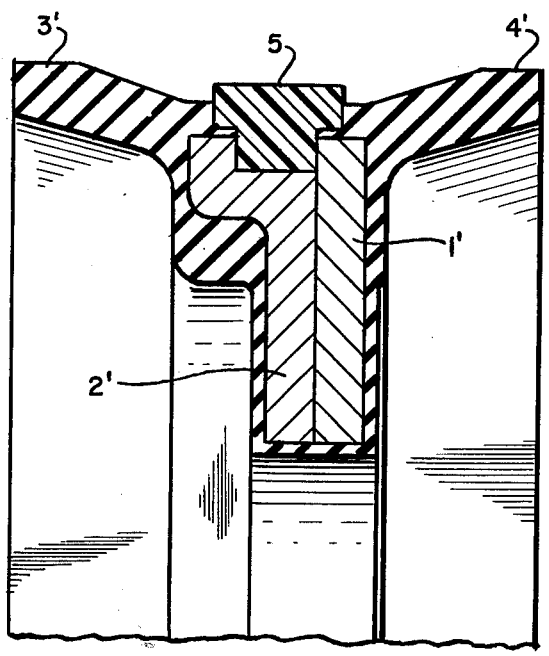
FIG. 2 shows a partial cross-sectional view of another embodiment of the invention.

In the embodiment shown in FIG. 2, the reinforcement ring comprises two asymmetrical parts 1' and 2' with angular gaskets 3', 4' prevulcanized thereon as in the previously explained embodiment.

It will be appreciated that the instant specification and examples are set forth by way of illustration and not limitation, and that various modifications and changes may be made without departing from the spirit and scope of the present invention.

What is claimed is:

1. A piston for use in pneumatic cylinders comprising a two part reinforcement ring having a groove on its outside circumference, a guide ring rigidly mounted in the groove, a tubular support of elastomer material on the inner circumference of the reinforcement ring and having radially outwardly extending flange-like parts and angular packing washers on both sides of the guide and engaging said guide ring wherein the tubular support with the flange-like parts and the packing washers are vulcanized on the reinforcement ring with the guide ring mounted thereon.

2. The piston according to claim 1, wherein the reinforcement ring comprises two symmetrical parts which are axially connected together from both sides of the guide ring.

3. The piston according to claim 1, wherein the guide ring comprises a plastic containing fibers.

4. The piston according to claim 1, wherein the reinforcement ring comprises two asymmetrical parts which are axially connected together from both sides of the guide ring.

5. The piston according to claim 3, wherein the plastic comprises a polyamide.

* * * * *